W. H. ZIMMERMAN.
TRACTOR ATTACHMENT.
APPLICATION FILED SEPT. 18, 1916.
1,279,070.
Patented Sept. 17, 1918.
3 SHEETS—SHEET 1.
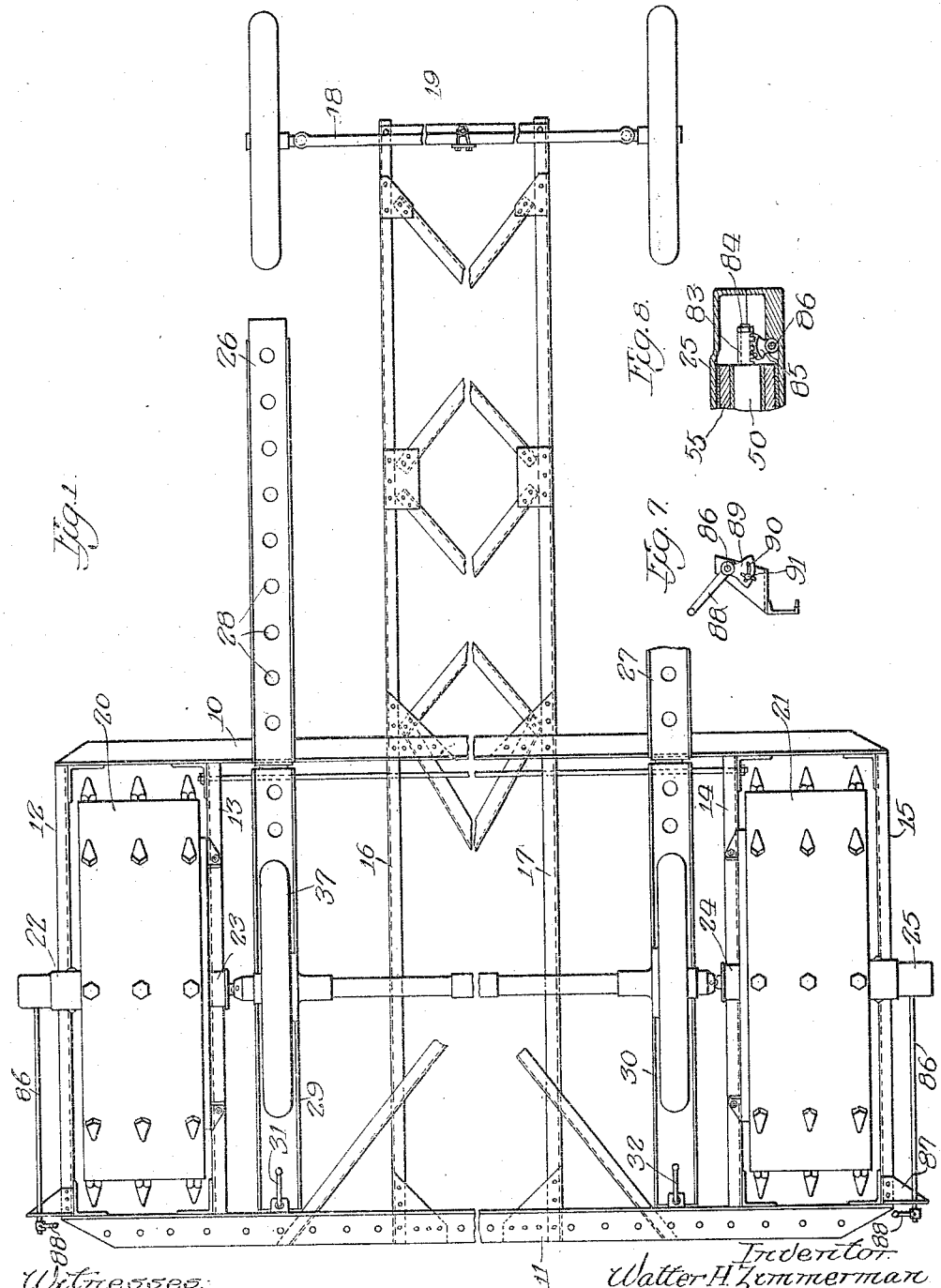

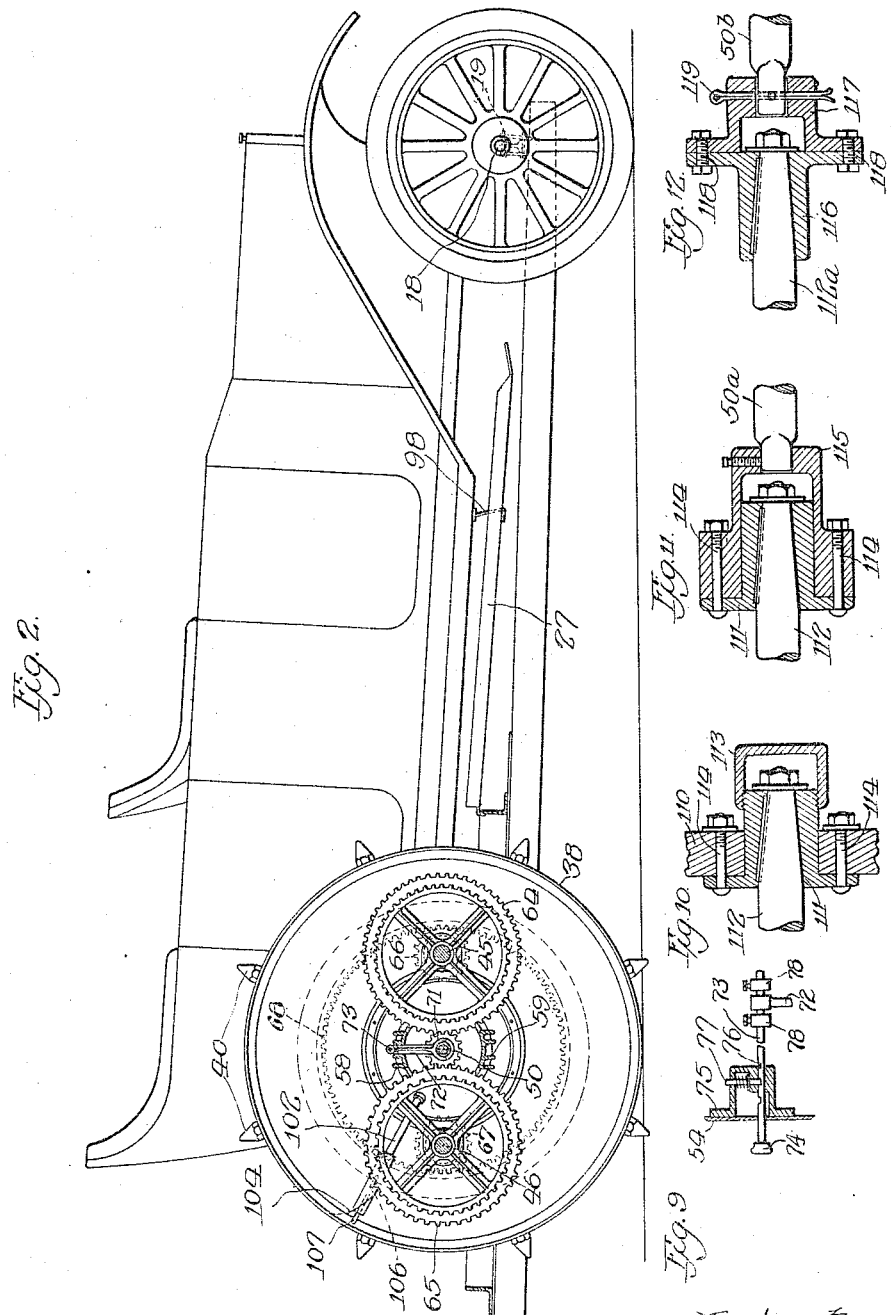

W. H. ZIMMERMAN.
TRACTOR ATTACHMENT.
APPLICATION FILED SEPT. 18, 1916.
1,279,070.
Patented Sept. 17, 1918.
3 SHEETS—SHEET 3.
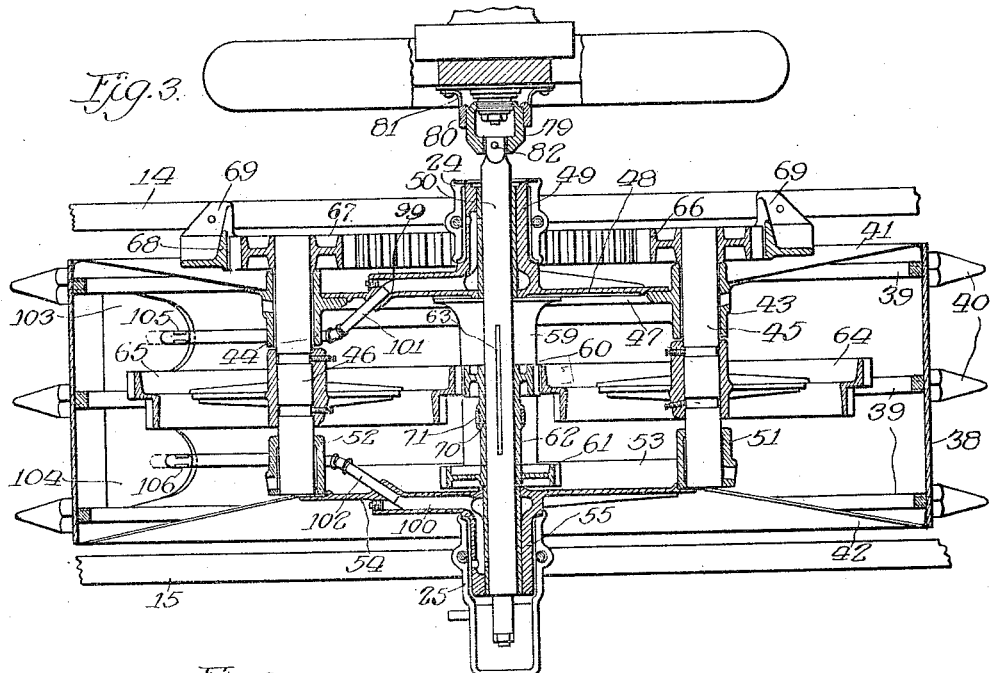
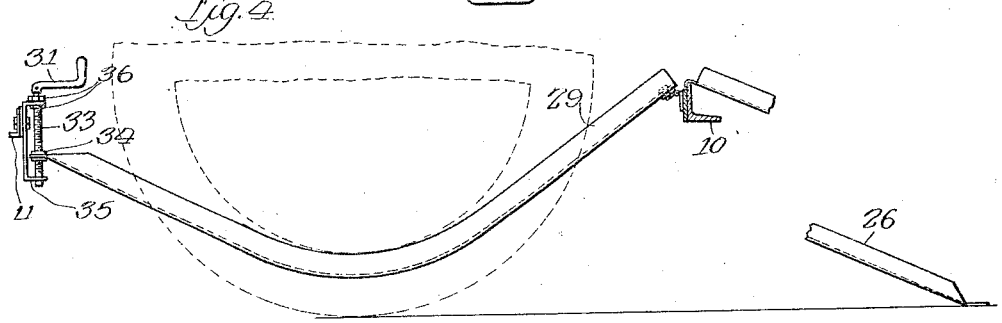
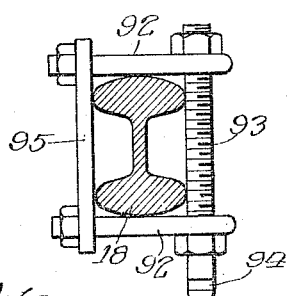
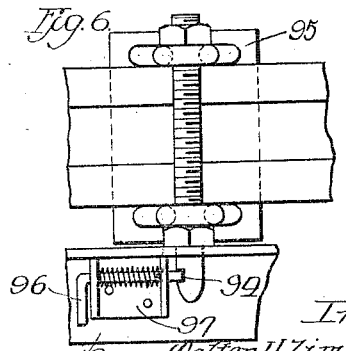
Witnesses:
C. H. Roesner.
R. Burkhardt.
Inventor
Walter H. Zimmerman.
By Albert C. Bell, Atty

UNITED STATES PATENT OFFICE.

WALTER H. ZIMMERMAN, OF CHICAGO, ILLINOIS.

TRACTOR ATTACHMENT.

1,279,070.

Specification of Letters Patent. Patented Sept. 17, 1918.

Application filed September 18, 1916. Serial No. 120,617.

*To all whom it may concern:*

Be it known that I, WALTER H. ZIMMERMAN, a citizen of the United States, residing at Chicago, in the county of Cook and State of Illinois, have invented a certain new and useful Improvement in Tractor Attachments, of which the following is a specification.

My invention relates to an improved tractor attachment by means of which an automobile may be converted into a tractor without modifying the automobile if desired with the exception that connecting devices are secured to the rear and front axles of the automobile for engaging the tractor mechanism.

By my invention I provide mechanism for extending the rear axle of the automobile, the axle extensions serving to directly support the rear end of the automobile clear from the ground, these axle extensions being preferably coaxial with the tractor wheels.

By my invention I also provide an improved form of tractor wheel in which the gearing for securing the desired speed changes is inclosed in each tractor wheel, the wheel being closed on its sides and provided with an automobile oiling system so that the wearing parts are properly lubricated with practically no attention from the operator.

My invention is shown in its preferred embodiment in the accompanying drawings in which:

Figure 1 shows in plan view the tractor attachment and its relation to the axles and wheels of an automobile, the remaining portion of the automobile being removed for the sake of clearness.

Fig. 2 shows in side view an automobile in place upon my tractor attachment,

Fig. 3 shows one of the tractor wheels in horizontal sectional view through the axis of the wheel and the manner of securing the tractor wheel to the adjacent automobile wheel, Fig. 4 shows in side elevation, the devices preferably employed for placing the rear wheels of the automobile in proper position for engagement with the tractor attachment, Figs. 5 and 6 are detail views taken from the side and front respectively of the devices employed to secure the front end of the tractor attachment to the front axle of the automobile, Fig. 7 is a detail view taken from the rear of the tractor of the operating mechanism for engaging one of the extension shafts with the coupling on the automobile rear axle, Fig. 8 is a vertical, sectional view through the outer end of one of the extension shafts showing the means employed to engage said shaft with the coupling on the rear axle of the automobile, Fig. 9 shows in detail view part of the gear shifting mechanism carried by each tractor wheel, and Figs. 10, 11 and 12 show modified constructions for connecting the extension axles and the rear axle of the automobile.

Similar numerals refer to similar parts throughout the several views.

As shown in Figs. 1 and 2 the tractor attachment consists of a rectangular frame work of rolled metal bars two of which as indicated at 10 and 11 extend transversely of the tractor and between which the other main members 12, 13, 14 and 15 extend longitudinally of the tractor. Between the members 13 and 14 additional longitudinal members 16 and 17 are connected to the transverse members 10 and 11 and extend in front of the member 10 so that their forward ends are slightly in front of the front axle 18 of the automobile. The members 16 and 17 are connected together at their forward ends by a transverse member 19.

The connecting framework of the tractor attachment constructed as described may be connected together in any manner known to the art, preferably by rivets, and diagonal bracing members may be provided for the framework as indicated, to make it a rigid structure under the strains to which it is subjected.

The tractor wheels 20 and 21 are located between the longitudinal members 12—13 and 14—15 respectively, the bearings 22 and 23 of the wheel 20 being attached to the members 12 and 13 and the bearings 24 and 25 of the wheel 21 being attached to the members 14 and 15 respectively.

To run the automobile upon the frame into proper position to receive the extension axles inclined run-ways 26 and 27 are provided, which are preferably formed from channel bars having bent upper ends to hook over the transverse member 10, as indicated in Figs. 1 and 4. The web of each channel is preferably provided with relatively large openings 28 to engage the tires of the rear wheels so that the automobile may be run up the incline under its own power. Between the transverse members 10 and 11 in line with the inclined run-ways 26 and 27, similar curved channel bar supports 29 and 30 are provided, hinged at their forward ends to the member 10 as indicated in Fig. 4 and supported at their rear ends by threaded rods terminating at their upper ends in cranks 31 and 32. These cranks are supported from the transverse member 11, the manner of support for both of them being the same as a result of which it will be necessary to describe but one of them, for example the crank 31. As shown in Fig. 4 the crank 31 is rigidly secured to the upper end of the threaded rod 33, which carries a grooved nut 34, the groove of which is engaged by a slot in the rear end of the supporting bar 29 so as to prevent turning of the nut 34 relatively to the bracket 35 employed to support the threaded rod from the member 11. To prevent vertical motion of the rod 33 in the bracket 35, nuts or collars 36 are rigidly secured to the upper end of the rod on either side of the upper supporting portion of the bracket 35, as a result of which when the rear wheel 37 of the automobile rests upon the supporting bar 29 said wheel may be moved to the desired position vertically by turning the crank 31. The supporting bars 29 and 30 are preferably provided with relatively large openings through their webs similar to and for the same purpose as the openings 28 referred to in connection with the inclined runways 26 and 27.

As shown more clearly in Fig. 3 each of the tractor wheels is formed from a sheet of metal 38 rolled into cylindrical form to constitute the outer cylindrical rim of the wheel, circularly formed reinforcing bars 39 being secured to the inner surface of the rim to receive the threaded ends of the spurs 40 projecting from the outer surface of the rim when it is desired to use the tractor on soft ground.

The sides of the wheel are closed by continuous plates 41 and 42 of thin sheet metal secured at their outer edges to the edges of the rim 38 and these side walls are dished inwardly and have formed in them concentric with the axis of the wheel, circular openings to permit the assembly in the wheel of the gearing and other mechanism contained therein. The inner edge of the side sheet 41 supports the bearings 43 and 44 for the intermediate shafts 45 and 46 respectively, these bearings being connected together by a circular flange 47.

The opening in the circular flange 47 is closed by a disk 48 secured thereto, which disk has formed integrally therewith the bearing 49 for the extension axle 50. The other ends of the intermediate shafts 45 and 46 are supported in bearings 51 and 52 secured to the inner edge of the sheet metal wall 42, these bearings being connected together by a flange 53 similar to the flange 47. The flange 53 supports the disk 54 which has formed integrally therewith a bearing 55 for the outer end of the extension axle 50.

The bearings 49 and 55 are revoluble with the wheel and support the bearings 24 and 25 secured to the members 14 and 15 of the frame work. The disks 48 and 54 are reinforced and held at a proper distance from each other by the spacing plates 58 and 59 rigidly secured at their ends to said disks.

The axle 50 carries between the disks 48 and 54 two gears 60 and 61 which are of different diameter and connected together by a sleeve 62, which is a sliding fit on the axle 50 but is prevented from turning thereon by a feather key 63. The intermediate shafts 45 and 46 have rigidly secured to them double gears 64 and 65 each gear having two sets of teeth of different pitch diameter, one for engaging the gear 60 and the other for engaging the gear 61. Each of the gears 64 and 65 is therefore in effect two gears. The shafts 45 and 46 have rigidly secured to their inner ends outside of the side wall of the tractor wheel, the pinions 66 and 67 meshing with the internal gear 68 supported by brackets 69 from the frame member 14.

As a result of the construction described, when the axle 50 is rotated in the bearings 49 and 55 the intermediate shafts 45 and 46 are rotated at a rate depending on which gears are in engagement and the gears 66 and 67 are rotated upon the internal gear 68 thus moving the intermediate shafts and the tractor wheel together with the bearings 49 and 55 in the stationary bearings 24 and 25.

The sleeve 62 has formed in its outer surface a groove 70 engaged by a yoke 71 secured to the lower end of an arm 72 the upper end of which passes through a slot therefor in the spacing plate 58 and is secured to a rod 73 extending through the side of the wheel, and as shown in Fig. 9 the rod 73 is provided at its outer end with an operating handle 74 outside of the housing 75 secured to the disk 54, which housing contains the locking mechanism for the rod. The rod 73 has cut in its upper surface three grooves 76, the outer ones being at a distance apart corresponding to the distance of the gears 60 and 61 from each other, and the housing 75 carries a spring plunger 77 which normally engages at its lower end one of the grooves 76. The rod 73 is prevented from moving longitudinally through the arm 72 by means of suitable collars 78 secured to the rod on either side of the upper end of the arm 72, the connection however permitting rotary motion of the rod 73 in the arm 72. When it is desired to shift the gears, the spring latch 77 is disengaged by first turning the rod 73 which lifts the latch to clear the engaged groove 76, after which the rod may be moved longitudinally in the housing 75 carrying with it the arm 72. The rod being turned again to its normal position engages the next notch in the adjustment of the gears and retains said adjustment until it is desired to change the relation of the gears. It will be observed that by this means the gears may be locked either with the gear 60 in mesh with the gears 64 and 65 or with the gear 61 in mesh with the gears 64 and 65 or if desired the shifting mechanism may be locked in an intermediate position in which neither of the gears is in engagement with the gears on the intermediate shafts.

The axle 50 in each of the tractor wheels is mounted in the bearings 49 and 55 so that it may be moved longitudinally in said bearings to engage the corresponding axle coupling of the automobile, to be driven thereby and also to support the automobile, the engagement referred to constituting the only support for the rear end of the automobile so that its rear wheels may rotate freely. To effect the engagement referred to the inner end of the axle 50 is squared or provided with some similar suitable flattened conformation and engages a corresponding opening in the outer end of a coupling 79 screwed on to the threaded end of the automobile wheel as indicated and held in place against rotation by a ring 80 which engages said coupling and is secured thereto in any desirable manner not shown, as for example by set screws, the ring 80 having extension arms 81 engaging the face of the hub between the rivets or fastening devices holding the automobile wheel together. The axle 50 is preferably held in place in the coupling 79 by a pin 82 which may be readily removed when it is desired to disconnect the automobile from the tractor attachment.

The outer end of each axle 50 as shown more clearly in Fig. 8 is of reduced diameter and carries a sleeve 83 which is held in place by a nut or collar 84 on the end of the axle, the sleeve 83 being freely rotatable upon said reduced portion. In the under surface of the sleeve 83 a rack is formed which meshes with the teeth of the segmental gear 85 which is rigidly secured to a shaft 86 supported by the bearing 25 and a bracket 87 secured to the rear end of the frame work. To the rear of the bracket 87 the shaft 86 has rigidly secured thereto an operating handle 88 which is continued below the shaft 86 as shown in Fig. 7 to form a segmental locking member 89 having a curved slot 90 through it for receiving a locking screw 91 by which the locking member may be clamped against the bracket 87 to prevent rotation of the shaft 86.

As shown in Figs. 5 and 6 the front axle 18 of the automobile has secured thereto by means of U bolts 92 a threaded rod 93, the lower end of which is pointed and provided with a groove 94. A clamping plate 95 is employed to hold the U bolts 92 in place. The transverse member 19 extending across the extreme front end of the tractor frame work, is provided with a hole through its horizontal leg for receiving the lower end of the rod 93 and the member 19 carries a spring bolt 96 supported in a bracket 97 for engaging the groove 94.

When it is desired to connect an automobile with the tractor attachment the runways 26 and 27 are put in place with their forward ends on the ground and the axles 50 are moved outwardly by means of the operating handles 88. The automobile is then backed up the runways and over the transverse member 10 until the rear axle is in alinement with the shafts 50. The cranks 31 and 32 are then turned until the rear axle of the automobile is brought into vertical alinement with the axles 50 for which condition the axles 50 are moved inwardly into engagement with the couplings connected to the rear axle of the automobile in which position the pins 82 are put in place and the handles 88 are locked against subsequent motion. The cranks 31 and 32 are then turned to lower the supporting members 29 and 30 as a result of which the rear end of the automobile is entirely supported by the connection of the rear axle of the automobile with the extension axles 50. The front end of the frame work 19 is then raised so as to bring the spring bolt 96 into engagement with the groove 94 in the lower end of the rod 93 which operation may be assisted or entirely performed by placing a small amount of driving effort upon the tractor wheels. The run-ways 26 and 27 are then raised and supported in elevated position as indicated for the run-way 27 in Fig. 2, by means of hooks 98 secured to the under side of the running boards of the automobile.

To lubricate the bearings of the extension axles 50, as well as the bearings of the tractor wheels, the following devices are provided. As shown in Fig. 3 the disks 48 and 54 are provided with oil passages 99 and 100 respectively, extending radially away from the axis of the disks, and the outer ends of these passages are in connection with pipes 101 and 102 which extend outwardly and slightly toward each other after which they extend radially again to support the sheet metal scoops 103 and 104 respectively.

The pipes 101 and 102 are provided inside the scoops and within their outer ends with openings 105 and 106 extending horizontally through them to receive the oil collected by the scoops which is directed into said openings by the outstanding walls formed on the inner edges of said scoops. Each of the pipes 101 and 102 contains a plunger rod 107 as shown for the pipe 102 in Fig. 2, which rod is of such dimensions that it moves back and forth freely in the pipe and when in its outermost position due to the rotation of the pipe and the wheel, the corresponding inlet openings 106 are uncovered and the oil collected by the scoop 104 may flow freely into the pipe 102. Continued rotation of the tractor wheel moves the pipe into a more nearly vertical position for which the rod 107 under the action of gravity drops in the pipe, forcing the oil ahead of it through the pipe 102 to the bearings 55 and 25. The operation of the oiling mechanism is facilitated by the fact that the formed rim and sides of the wheel together constitute a receptacle having tight joints which will contain a considerable quantity of oil. The motion of the scoops through the oil besides directing the oil through the pipes 101 and 102 carries the oil so completely around the wheel that the intermediate shafts and the gears carried thereby are kept in thoroughly oiled condition.

In case it is desired to remove the rear wheels of the automobile before connecting it to the tractor, the modified construction shown in Figs. 10 and 11 may be used to advantage. With this construction each rear wheel 110 of the automobile is provided with a hub 111 secured to the rear axle 112 by a key and nut in the usual manner. The hub 111 has its supporting flange inside of the body of the wheel so that the wheel may be removed from its hub without removing the hub from the axle, by removing the cap 113 and the nuts of the bolts 114. A coupling 115 is then secured to the hub by the bolts 114, said coupling having a flat sided hole in its end to receive the end of the extension axle 50$^a$ of a tractor wheel, the extension axle being held in place by a set screw as indicated. This constitutes a somewhat stronger coupling than that previously described. If it is desired to use the automobile only as a tractor, the simpler coupling shown in Fig. 12 may be employed. This consists of two flanged coupling members 116 and 117, the member 116 being secured to the rear automobile axle 112$^a$ in the usual manner and the member 117 having a recess for receiving the axle nut and secured to the member 116 by bolts 118. The member 117 is provided with a flat sided axial hole to receive the similarly formed end of the extension axle 50$^b$ which is held in place by a split cotter pin 119 as indicated. The end of the extension axle if square as indicated may have intersecting holes formed through it for receiving the pin 119, so that the squared end may be inserted into the coupling in the first engaging position that is convenient and for any engaging position the pin 119 may be inserted.

From the above it will be observed that by my invention the rear end of the automobile is supported entirely by the extension axles by coupling devices between them and the rear or power axle of the automobile and that this is the only engagement between any of the tractor attachment parts and the rear end of the automobile. It will also be observed that the tractor wheels directly support the extension axles and also directly support the framework, and that the framework serves only to hold the tractor wheels in proper position relatively to each other and to react against the driving torque exerted upon the tractor wheels.

While I have shown my invention in the particular embodiments above described I do not however limit myself to these exact constructions as I may employ equivalents thereof known to the art at the time of the filing of this application without departing from the scope of the appended claims.

What I claim is:

1. In a tractor attachment for automobiles, the combination of a framework, tractor wheels carrying said framework, shafts in said tractor wheels for coupling with and supporting the rear axle of an automobile, said shafts constituting extensions of said rear axle, and a rigid coupling carried by each end of said rear axle for direct engagement with the adjacent extension axle to drive the latter.

2. In a tractor attachment for automobiles, the combination of a framework, tractor wheels carrying said framework, shafts in said tractor wheels for coupling with and supporting the rear axle of an automobile, said shafts constituting extensions of said rear axle, reducing gearing between said shafts and said tractor wheels, and a rigid coupling carried by each end of said rear axle for direct engagement with the adjacent extension axle to drive the latter.

3. In a tractor attachment for automobiles, the combination of a framework, tractor wheels carrying said framework, shafts in said tractor wheels for coupling with and supporting the rear axle of an automobile, said shafts constituting extensions of said rear axle, and multiple-speed gearing between said shafts and said tractor wheels.

4. In a tractor attachment for automobiles, the combination of a framework, tractor wheels carrying said framework, and shafts in said tractor wheels for coupling with and supporting the rear axle of an automobile, said shafts constituting extensions of said rear axle, reducing gearing between said shafts and said tractor wheels, said gearing being contained in said tractor wheels, and a rigid coupling carried by each end of said rear axle for direct engagement with the adjacent extension axle to drive the latter.

5. In a tractor attachment for automobiles, the combination of a framework, tractor wheels carrying said framework, shafts in said tractor wheels for coupling with and supporting the rear axle of an automobile, said shafts constituting extensions of said rear axle, and multiple-speed gearing between said shafts and said tractor wheels, said gearing being contained in said tractor wheels.

6. In a tractor attachment for automobiles, the combination of a framework, tractor wheels carrying said framework, shafts in said tractor wheels for coupling with and supporting the rear axle of an automobile, said shafts constituting extensions of said rear axle, the ends of said shafts being flattened, and couplings on the automobile axle having openings fitting said flattened ends to drive said shafts.

7. In a tractor attachment for automobiles, the combination of a framework, tractor wheels carrying said framework, shafts in said tractor wheels for coupling with and supporting the rear axle of an automobile, said shafts constituting extensions of said rear axle, reducing gearing between said shafts and said tractor wheels, the ends of said shafts being flattened, and couplings on the automobile axle having openings fitting said flattened ends to drive said shafts.

8. In a tractor attachment for automobiles, the combination of a framework, sliding shafts for receiving the rear axle of an automobile between them, tractor wheels carrying said framework and said shafts, and devices for moving said shafts to couple them with the rear axle of an automobile to support the same, said shafts constituting extensions of said rear axle.

9. In a tractor attachment for automobiles, the combination of a framework, sliding shafts for receiving the rear axle of an automobile between them, tractor wheels carrying said framework and said shafts, and gearing for moving said shafts to couple them with the rear axle of an automobile to support the same, said shafts constituting extensions of said rear axle.

10. In a tractor attachment for automobiles, the combination of a framework, sliding shafts for receiving the rear axle of an automobile between them, tractor wheels carrying said framework and said shafts, devices for moving said shafts to couple them with the rear axle of an automobile to support the same, said shafts constituting extensions of said rear axle, and mechanism carried by the framework to prevent operation of said devices.

11. In a tractor attachment for automobiles, the combination of a framework, sliding shafts for receiving the rear axle of an automobile between them, tractor wheels carrying said framework and said shafts, gearing for moving said shafts to couple them with the rear axle of an automobile to support the same, said shafts constituting extensions of said rear axle, and mechanism carried by the rear end of said framework to prevent operation of said gearing.

12. In a tractor attachment for automobiles, the combination of a framework, supporting shafts mounted in line with each other, tractor wheels supporting said framework and said shafts, intermediate shafts mounted in and carried by said tractor wheels and driven from said supporting shafts, driving pinions secured to said intermediate shafts, and gears rigidly secured to said framework and engaged by said pinions, said supporting shafts adapted to couple with and support the rear axle of an automobile and constitute extensions of said rear axle.

13. In a tractor attachment for automobiles, the combination of a framework, supporting shafts mounted in line with each other, tractor wheels supporting said framework and said shafts, intermediate shafts mounted in and carried by said tractor wheels and driven from said supporting shafts, driving pinions secured to said intermediate shafts, gears rigidly secured to said framework and engaged by said pinions, said supporting shafts adapted to couple with and support the rear axle of an automobile and constitute extensions of said rear axle, and multiple-ratio gearing between said supporting shafts and said intermediate shafts.

14. In a tractor attachment for automobiles, the combination of a framework, supporting shafts mounted in line with each other, tractor wheels supporting said framework and said shafts, intermediate shafts mounted in and carried by said tractor wheels and driven from said supporting shafts, driving pinions secured to said intermediate shafts, and internal gears rigidly secured to said framework and engaged by said pinions, said supporting shafts adapted to couple with and support the rear axle of an automobile and constitute extensions of said rear axle.

15. In a tractor attachment for automobiles, the combination of a framework, supporting shafts mounted in line with each other, tractor wheels supporting said framework and said shafts, intermediate shafts mounted in and carried by said tractor wheels and driven from said supporting shafts, driving pinions secured to said intermediate shafts, internal gears rigidly secured to said framework and engaged by said pinions, said supporting shafts adapted to couple with and support the rear axle of an automobile and constitute extensions of said rear axle, and multiple-ratio gearing between said supporting shafts and said intermediate shafts.

16. In a tractor attachment for automobiles, the combination of a framework, supporting shafts mounted in line with each other, tractor wheels supporting said framework and said shafts, intermediate shafts mounted in and carried by said tractor wheels and driven from said supporting shafts, driving pinions secured to said intermediate shafts, and gears rigidly secured to said framework and engaged by said pinions, said supporting shafts adapted to couple with and support the rear axle of an automobile and constitute extensions of said rear axle, said tractor wheels being formed from sheet metal and having inwardly dished sides to receive said gears.

17. In a tractor attachment for automobiles, the combination of a framework, supporting shafts mounted in line with each other, tractor wheels supporting said framework and said shafts, intermediate shafts mounted in and carried by said tractor wheels and driven from said supporting shafts, driving pinions secured to said intermediate shafts, and internal gears rigidly secured to said framework and engaged by said pinions, said supporting shafts adapted to couple with and support the rear axle of an automobile and constitute extensions of said rear axle, said tractor wheels being formed from sheet metal and having inwardly dished sides to receive said internal gears.

18. In a tractor attachment for automobiles, the combination of a framework, tractor wheels carrying said framework, shafts in said tractor wheels for coupling with and supporting the rear axle of an automobile, said shafts constituting extensions of said rear axle, said tractor wheels having inclosed sides for retaining oil therein, and devices in said tractor wheels for directing the oil to the bearings thereof.

19. In a tractor attachment for automobiles, the combination of a framework, tractor wheels carrying said framework, shafts in said tractor wheels for coupling with and supporting the rear axle of an automobile, said shafts constituting extensions of said rear axle, said tractor wheels having inclosed sides for retaining oil therein, and automatic pumps in said tractor wheels for directing the oil to the bearings thereof.

20. In a tractor attachment for automobiles, the combination of a framework, supporting shafts mounted in line with each other, tractor wheels supporting said framework and said shafts, intermediate shafts mounted in said tractor wheels and driven from said supporting shafts, driving pinions secured to said intermediate shafts, gears rigidly secured to said framework and engaged by said pinions, said supporting shafts adapted to couple with and support the rear axle of an automobile and constitute extensions of said rear axle, and multiple-ratio gearing between said supporting shafts and said intermediate shafts, said multiple-ratio gearing comprising two gears of different diameter feathered upon each supporting shaft and two gears secured to each intermediate shaft, one for engagement with each of the gears on the corresponding supporting shaft, and mechanism for moving either gear on a supporting shaft into mesh with the corresponding gear on an intermediate shaft or disengaging both of said gears as desired.

21. In a tractor attachment for automobiles, the combination of a framework, tractor wheels, extension axles for the rear axle of an automobile, gearing between the extension axles and the tractor wheels and a rigid coupling carried by each end of said rear axle for direct engagement with the adjacent extension axle to drive the latter.

22. In a tractor attachment for automobiles, the combination of a framework, tractor wheels, extension axles for the rear axle of an automobile, and multiple-ratio gearing between the extension axles and the tractor wheels.

23. In a tractor attachment for an automobile, the combination of a framework, tractor wheels, extension axles in the tractor wheels for extending and supporting the rear axle of an automobile, gearing between the extension axles and the tractor wheels and a rigid coupling carried by each end of said rear axle for direct engagement with the adjacent extension axle to drive the latter.

24. In a tractor attachment for an automobile, the combination of a framework, tractor wheels, extension axles in the tractor wheels for extending and supporting the rear axle of an automobile, and multiple-ratio gearing between the extension axles and the tractor wheels.

In witness whereof I hereunto subscribe my name this 17th day of June, A. D. 1918.

WALTER H. ZIMMERMAN.

Copies of this patent may be obtained for five cents each, by addressing the "Commissioner of Patents, Washington, D. C."